(12) United States Patent
Parish

(10) Patent No.: US 7,823,235 B2
(45) Date of Patent: Nov. 2, 2010

(54) PIPE CLEANING AND CUTTING TOOL

(76) Inventor: Theodore Parish, 413 Elm St., Wyandotte, MI (US) 48192

( * ) Notice: Subject to any disclaimer, the term of this patent is extended or adjusted under 35 U.S.C. 154(b) by 0 days.

(21) Appl. No.: 12/101,705

(22) Filed: Apr. 11, 2008

(65) Prior Publication Data

US 2008/0250648 A1   Oct. 16, 2008

Related U.S. Application Data

(60) Provisional application No. 60/911,101, filed on Apr. 11, 2007.

(51) Int. Cl.
 *B23D 21/00* (2006.01)
 *B08B 1/02* (2006.01)
 *B08B 9/02* (2006.01)

(52) U.S. Cl. .............. 7/158; 30/93; 15/104.03
(58) Field of Classification Search ........ 7/157, 7/158; 30/92, 93–97
See application file for complete search history.

(56) References Cited

U.S. PATENT DOCUMENTS

| | | | | |
|---|---|---|---|---|
| 2,563,483 A * | 8/1951 | O'Hagan | ............... | 30/102 |
| 2,753,744 A * | 7/1956 | Therien | ............... | 81/57 |
| 3,355,749 A * | 12/1967 | Steffen | ............... | 7/157 |
| 4,238,867 A * | 12/1980 | Ruggero et al. | ........ | 15/88 |
| 4,349,928 A * | 9/1982 | Mlikotin | .............. | 7/157 |
| 4,858,316 A * | 8/1989 | Dubey | ............... | 30/102 |
| 4,862,549 A * | 9/1989 | Criswell et al. | ........ | 15/104.04 |
| 4,953,292 A * | 9/1990 | Tobey | ............... | 30/97 |
| 5,056,265 A * | 10/1991 | Hurst | ............... | 451/69 |
| 5,269,104 A * | 12/1993 | DiBiagio | ........... | 451/344 |
| 5,307,534 A * | 5/1994 | Miller | ............... | 15/4 |
| 5,495,672 A * | 3/1996 | Kritchever et al. | ..... | 30/97 |
| 5,566,416 A * | 10/1996 | Karls | ............... | 15/104.04 |
| 5,791,005 A * | 8/1998 | Grabowski et al. | ..... | 15/104.04 |
| 5,829,142 A * | 11/1998 | Rieser | ............... | 30/93 |
| 5,943,778 A * | 8/1999 | Alana | ............... | 30/101 |
| 6,189,216 B1 * | 2/2001 | Dureiko | ............ | 30/102 |
| 6,202,307 B1 * | 3/2001 | Wrate | ............... | 30/101 |
| 6,237,449 B1 * | 5/2001 | Orlosky | ............ | 81/360 |
| 6,336,270 B1 * | 1/2002 | Dureiko | ............ | 30/102 |
| 6,393,645 B1 * | 5/2002 | Kadinger | .......... | 15/104.04 |
| 6,698,048 B1 * | 3/2004 | Greene | ............ | 7/158 |
| 6,810,587 B1 * | 11/2004 | Robertson | ......... | 30/96 |
| 7,406,769 B1 * | 8/2008 | Toussaint | ......... | 30/93 |
| 2003/0041399 A1 * | 3/2003 | Knowles | ......... | 15/104.04 |
| 2003/0121156 A1 * | 7/2003 | Walsh et al. | ...... | 30/97 |
| 2003/0172481 A1 * | 9/2003 | Yehia | ............... | 15/104.04 |
| 2004/0255414 A1 * | 12/2004 | Tulipana | .......... | 15/104.04 |
| 2006/0037198 A1 * | 2/2006 | Sullivan | ......... | 30/92 |
| 2007/0214648 A1 * | 9/2007 | Lazarevic | ........ | 30/102 |

* cited by examiner

*Primary Examiner*—David B Thomas
(74) *Attorney, Agent, or Firm*—Rader, Fishman & Grauer, PLLC

(57) ABSTRACT

Various embodiments of a pipe cleaning tool are disclosed. In one embodiment, the pipe cleaning tool comprises a body and a plurality of pipe cleaners. The pipe cleaners are adapted to clean at least two different sizes of pipes. In another embodiment, a pipe cutter device is disclosed.

15 Claims, 10 Drawing Sheets

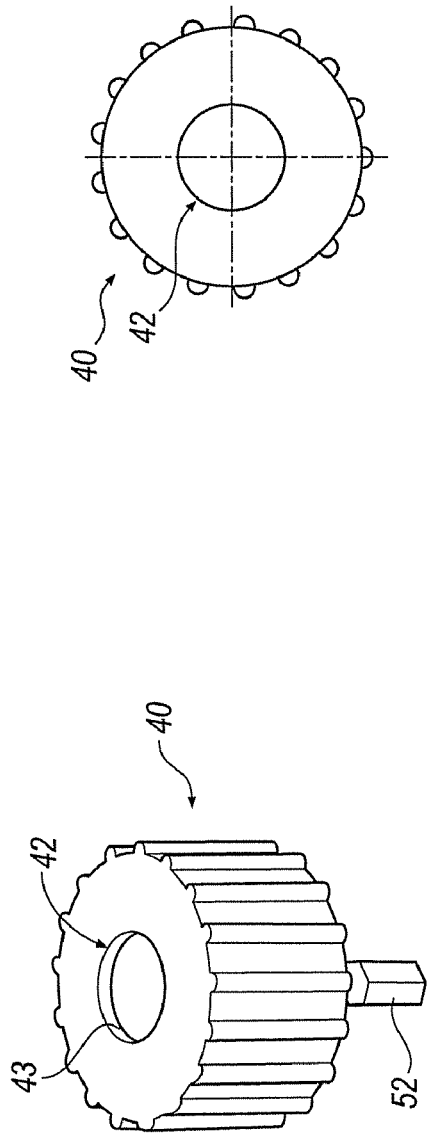
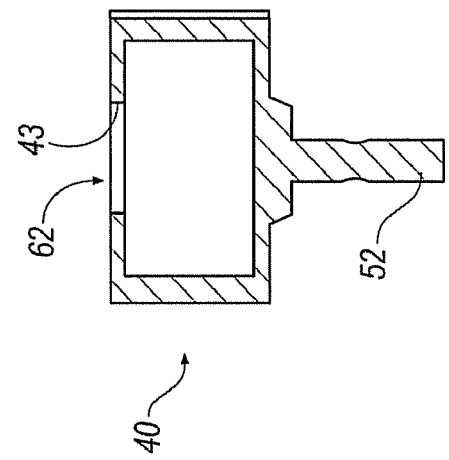
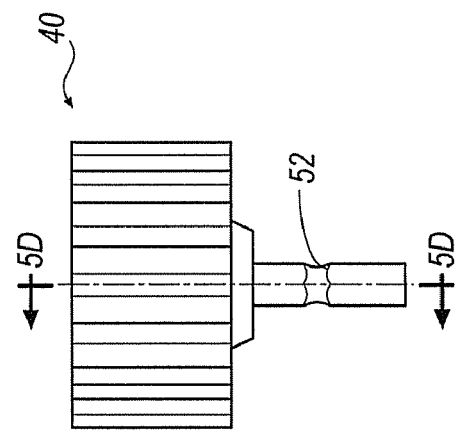
FIG. 5B
FIG. 5D
FIG. 5A
FIG. 5C

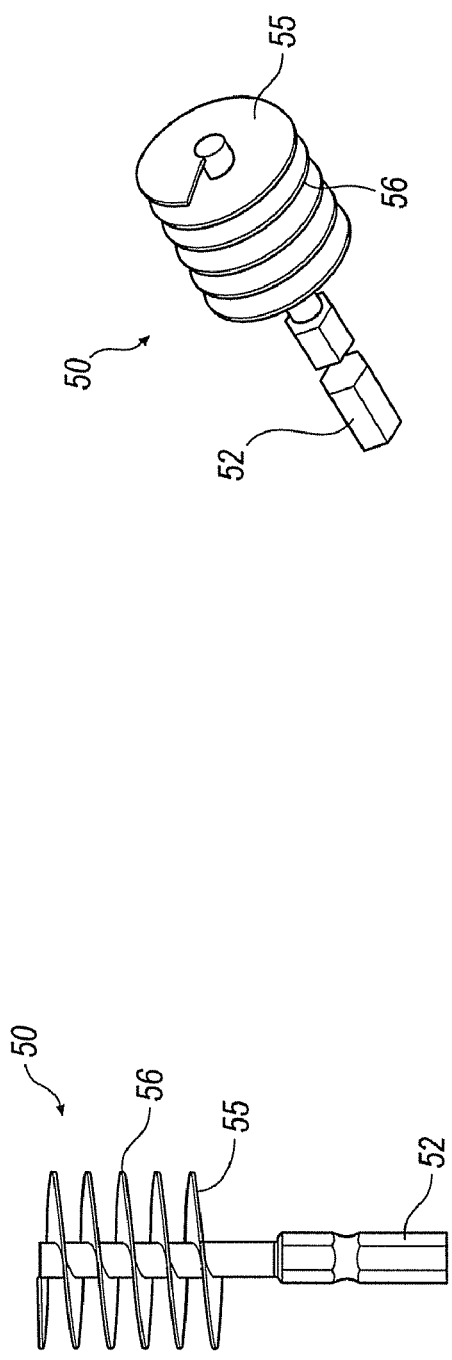
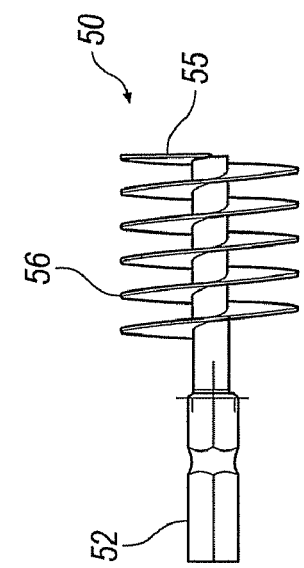
FIG. 6B
FIG. 6D
FIG. 6A
FIG. 6C

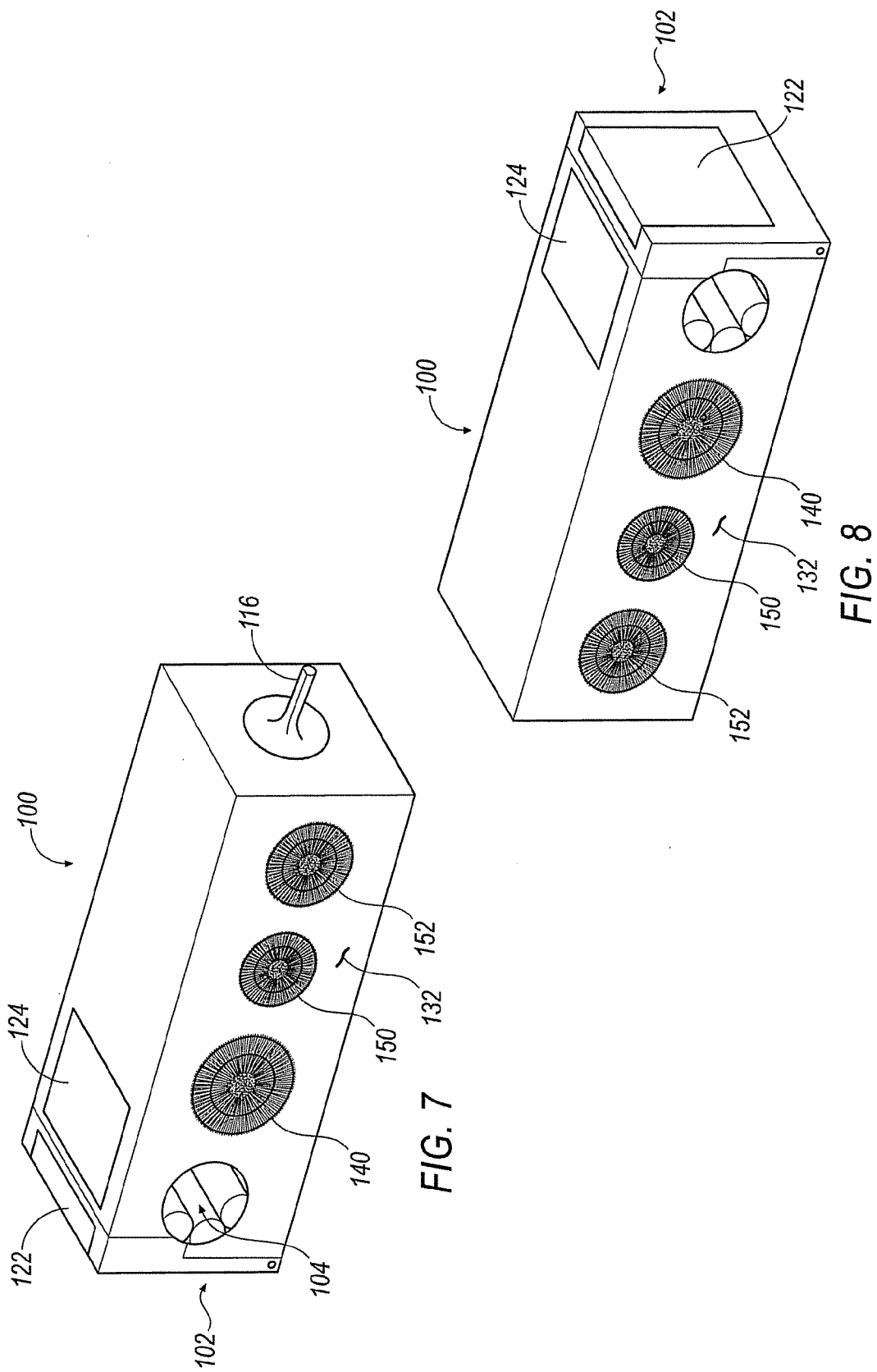

PIPE CLEANING AND CUTTING TOOL

CROSS REFERENCE TO RELATED APPLICATIONS

This application claims the benefit of U.S. Provisional Application Ser. No. 60/911,101 filed Apr. 11, 2007 which is hereby incorporated by reference in its entirety.

TECHNICAL FIELD

This disclosure relates generally to a pipe cleaning tool. An optional pipe cutting tool is also disclosed.

BACKGROUND

A structure, such as a house, typically has one or more plumbing systems. For example, a house may have water supply piping that brings water to the house and distributes it to fixtures and appliances, including outdoor sprinklers and irrigation. A house may also have drain and waste plumbing to disposes of used water and waste. Further, a house may include vent piping to exhaust sewer gasses and provides proper pressure for the drainpipes. In some instances, a house may also have gas piping to deliver gas, such as natural gas or propane, to gas-fired appliances. Some houses even have pipe systems to service swimming pools and hot tubs.

When installing or maintaining such plumbing systems, a plumber must bond pipes together. For example, a plumber may use various connectors to couple pieces of piping together, and then may use a bonding agent, such as glue or solder, to bond the connection, creating a seal. To ensure a good seal, a plumber must clean and polish the pipe and connector surfaces to remove debris, burs, dirt, etc. In some instances, it may be necessary or desirable to cut a portion of the pipe.

BRIEF DESCRIPTION OF THE DRAWINGS

FIGS. 5A-5D are various views of an exterior pipe cleaner.
FIGS. 6A-6D are various views of an interior pipe cleaner.
FIG. 7 is a first perspective view of a pipe cleaning tool with an optional pipe cutter section.

FIG. 8 is a second perspective view of the pipe cleaning tool of FIG. 7.

DETAILED DESCRIPTION

Figure 2:
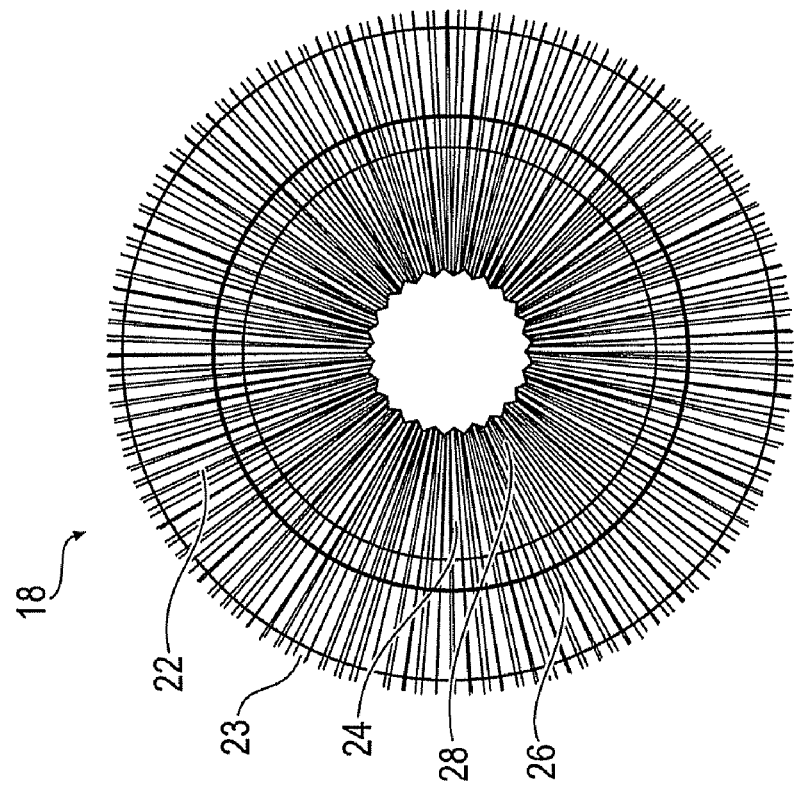
FIG. 2 is a close-up view of a portion of the pipe cleaning tool of FIG. 1.
Figure 1:
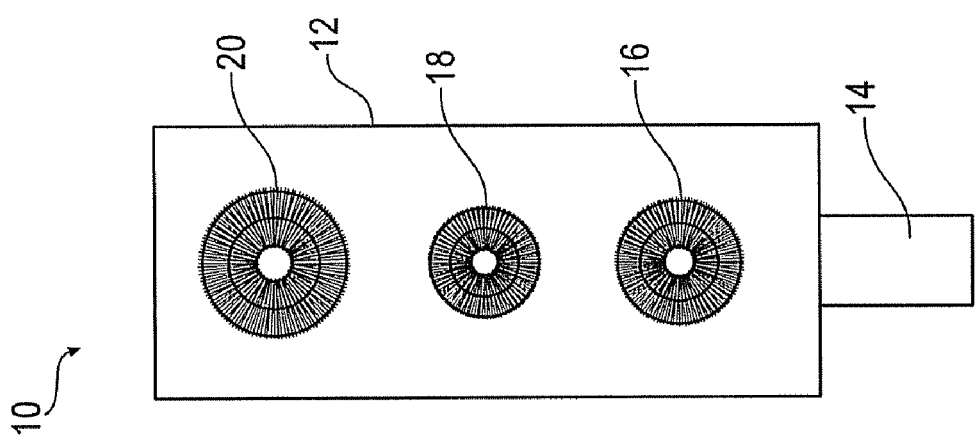
FIG. 1 is a front view of an embodiment of a pipe cleaning tool.

Referring to FIGS. 1 and 2, an embodiment of a pipe cleaning tool 10 is illustrated. Pipe cleaning tool 10 is generally designed to clean, polish, debur, and/or rough-up an interior and/or an exterior surface of a pipe or tube, such as copper tubing commonly used for household plumbing. Pipe cleaning tool 10 is generally capable of cleaning multiple pipes or fittings simultaneously, including piping or tubing of various sizes. When installing or maintaining a plumbing system, pipe sections are generally joined with other pipes, couplers, or pipe fittings using a bonding agent like glue or solder. To ensure a good seal, the mating surfaces should be cleaned, polished, deburred, and/or roughed-up before applying the bonding agent and joining the pipes. Of course, there are many different types and sizes of plumbing system components, including piping, tubing, couplers, fittings, etc. One skilled in the art will recognize that pipe cleaner 10, as well as other disclosed embodiments, may be used to prepare a wide variety of plumbing system components for joining, including components of various sizes.

According to FIG. 1, an embodiment of a pipe cleaning tool 10 generally includes a body 12, a handle 14, and pipe cleaners 16, 18, and 20. Body 12 may provide a mounting surface for pipe cleaners 16, 18, and 20, and may also provide housing for other mechanical components. Handle 14 may be used by a user's hand to steady pipe cleaner 10, or may be placed in a vice or secured in some other manner. Body 12 and handle 14 may be made from various materials including metal, wood, plastic, and various composite materials. Furthermore, body 12 and handle 14 may be configured into a wide variety of shapes and sizes. For example, body 12 may be designed to accommodate various numbers and sizes of pipe cleaners or hold batteries, or may be designed to mount to a table or tool box.

Pipe cleaners 16, 18, and 20 may be multi-purpose pipe cleaners of various sizes. For example, pipe cleaner 18 may be adapted to clean ½" copper tubing, while pipe cleaners 16 and 20 may be adapted to clean ¾" and 1" tubing, respectively. In one embodiment, pipe cleaners 16, 18, and 20 are secured to body 12 such that they are prevented from moving or rotating. In such an embodiment, a user may simply insert the end of a section of pipe or tubing into the appropriately sized pip cleaner, and rotate the pipe or the tool to clean both the interior and exterior surface of the pipe simultaneously. In another embodiment, body 12 may enclose various mechanical and/or electrical components to rotate pipe cleaners 16, 18, and 20. In such an embodiment, pipe cleaners 16, 18, and 20 may be rotatably driven by a gear and/or a motor, thereby enabling a user to clean a pipe without having to rotate the tool or the pipe.

As shown in FIG. 2, pipe cleaner 18 may be configured to simultaneously clean both an interior and an exterior surface of a plumbing component, such as a pipe. Pipe cleaner 18 generally includes a housing 22, a recess 26, and a brush 28. Housing 22 generally includes an exterior surface 23, and an interior surface 24 within recess 26. Exterior surface 23 may provide a hand grip for manually rotating pipe cleaner 18, or may include a grinding or polishing surface. Generally, recess 26 is adapted to fit a particular size of plumbing equipment. For example, pipe cleaner 18 may be configured to prepare ½" copper tubing, so recess 26 may be adapted to receive ½" tubing. Generally, interior surface 24 includes a polishing or grinding surface for cleaning the exterior of a pipe, and brush 28 is adapted to clean the interior surface of the pipe.

In one embodiment, the pipe cleaners may be removably mounted to the pipe cleaning tool 10 such that the pipe cleaners may be replaced periodically, as desired.

Figure 3:
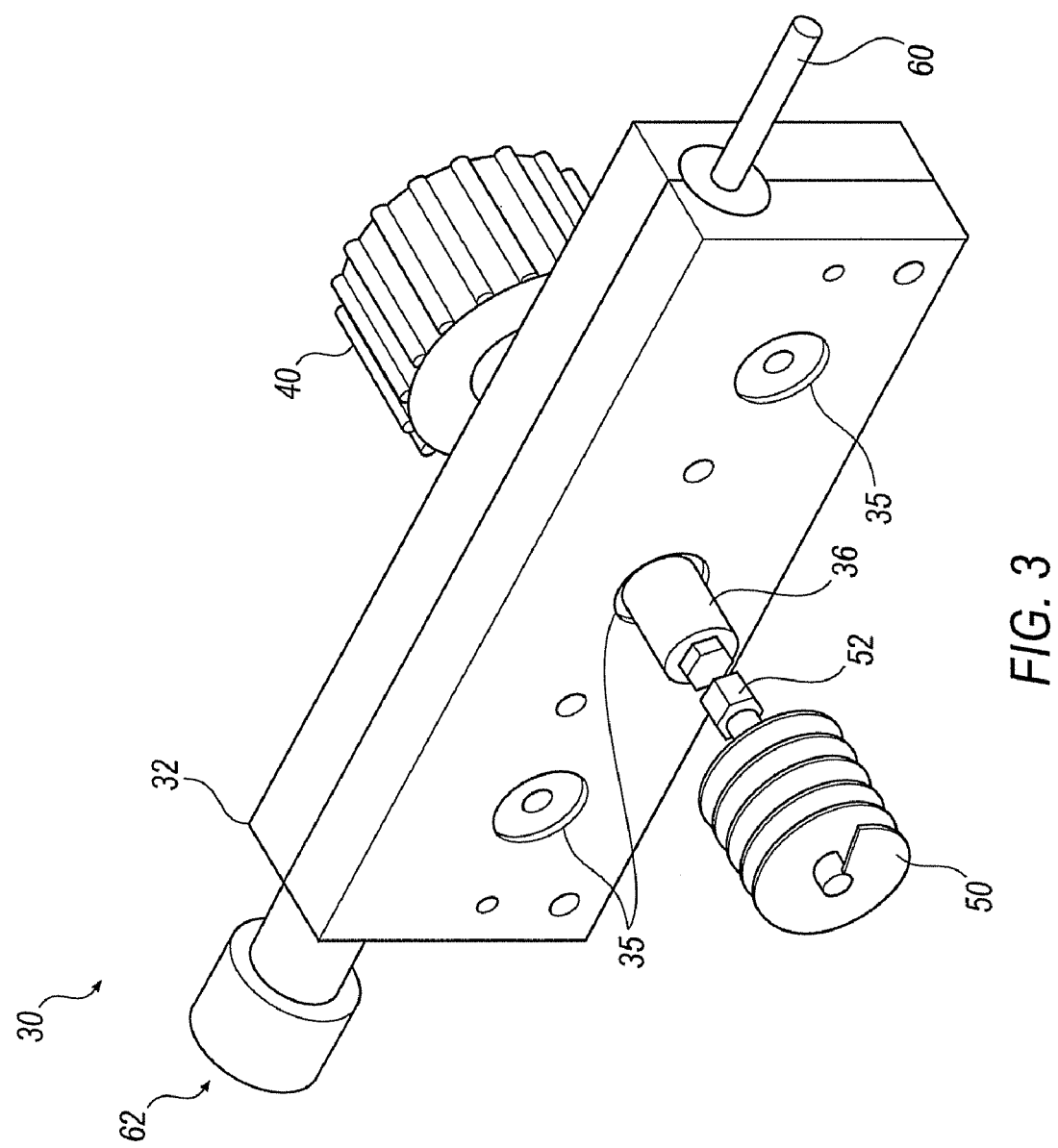
FIG. 3 is a perspective view of a pipe cleaning tool according to an embodiment.

FIG. 3 illustrates another embodiment of a pipe cleaning tool 30. Pipe cleaning tool 30 generally includes a body 32, an exterior pipe cleaner 40, an interior pipe cleaner 50, and a drive input 70. Generally, body 32 houses various mechanical and/or electrical components used to rotate exterior and interior pipe cleaners 40, 50. Furthermore, body 32 may include a plurality of pipe cleaners and/or other accessories. For example, body 32, as shown in FIG. 3, includes six accessory ports 35, three on each side of body 32. Each accessory port 35 may receive exterior pipe cleaner 40, interior pipe cleaner 50, or some other accessory. In one embodiment, pipe cleaning tool 30 includes three pairs of exterior and interior pipe cleaners 40, 50, where each pair is adapted to clean a different size of plumbing equipment. For example, the three pairs may be adapted to ½", ¾", and 1" copper tubing. In one embodiment, as shown in FIG. 3, interior pipe cleaner 50 includes an attachment arm 52 that can be releasably secured into an accessory receiver 36. Accessory receiver 36 may releasably secure various accessories, such as interior pipe cleaner 50, in place by magnetism, by a security screw, or by some other means.

Pipe cleaning tool 30 may be driven by hand, or may be driven by an external motor or drill. As shown in FIG. 3, drive input 70 includes a receiver 62 for releasably coupling to a drill attachment, such as a screwdriver, socket, or driver attachment. In one embodiment, a user secures pipe cleaning tool 30 to a workbench or a toolbox. A user may connect a drill or other external motor to drive input 70 and engaging the motor or drill, which causes accessory ports 35 to rotate. A user may then use the variously sized exterior and interior pipe cleaners 40, 50 to clean various sized plumbing equipment in preparation for joining using a bonding agent like glue or solder.

Pipe cleaning tool 30 may also include a drive train adjustment 60 for adjusting the interior drive gears of body 32. Drive train adjustment 60 may be used to move the various interior gears to ensure proper engagement with the various other gears within body 32.

Figure 4:
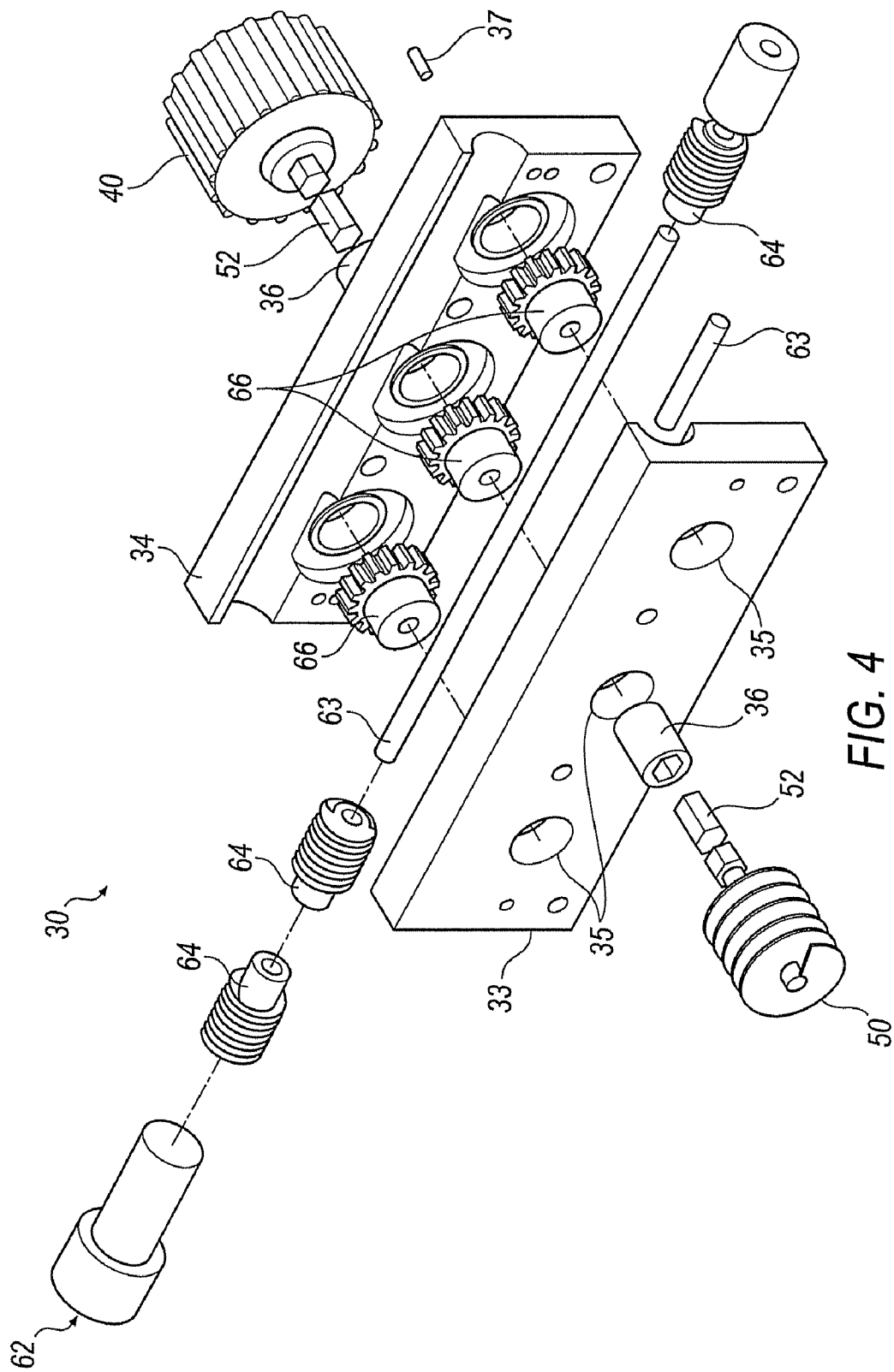
FIG. 4 is an exploded view of the pipe cleaning tool of FIG. 3.

FIG. 4 is an exploded view of pipe cleaning tool 30. As shown in FIG. 4, body 32 may be formed by joining two halves 33, 34 together using various fasteners 37. Furthermore, pipe cleaning tool 30 may include a drive train system that includes a plurality of gears and a drive shaft connected to drive input 70. The drive train system, as shown in FIG. 4, is merely illustrative of one example of a drive train system. One skilled in the art will recognize that many alternative systems may be employed to rotate the various accessory ports. The drive train system may include drive input 70, a drive shaft 63, several drive gears 64, and several accessory gears 66. Drive input 70 may be connected to drive shaft 63, which runs the length of body 32. Drive gears 64 may be positioned along and secured to drive shaft 63, such that they can drive accessory gears 66. Accessory gears 66 generally rotate within accessory ports 35 and may be connected to accessory receiver 36. In such an embodiment, accessory gears 66 rotate accessory receivers 36, which in turn rotate exterior and interior pipe cleaners 40, 50.

FIGS. 5A-5D illustrate one embodiment of an exterior pipe cleaner 40. As shown in the various Figures, exterior pipe cleaner 40 generally includes a recess 42 and an attachment arm 52. Recess 42 generally includes a cleaning surface 43 that contacts the exterior surface of a pipe. Cleaning surface 43 may include various forms of sand paper or other cleaning, polishing, deburring, roughing, or grinding surfaces used to prepare the exterior surface of a pipe for joining using a bonding agent like glue or solder.

FIGS. 6A-6D illustrate one embodiment of an interior pipe cleaner 50. As shown in the various Figures, interior pipe cleaner 50 generally includes a cleaning ridge 55 and an attachment arm 52. Cleaning ridge 55 may be configured as a helix attached to a central shaft. Ridge 55 generally includes an outer periphery 56 that contacts the interior surface of a pipe or other piece of plumbing equipment. Outer periphery 56 may include various forms of sand paper or other cleaning, polishing, deburring, roughing, or grinding surfaces used to prepare the interior surface of a pipe for joining using a bonding agent like glue or solder.

In one embodiment, the pipe cleaners 40 and 50 are removably mounted to the pipe cleaning tool 30 such that the pipe cleaners 40 and 50 are selectively replaceable and may be provided separately from the pipe cleaning tool 30.

Figure 9:
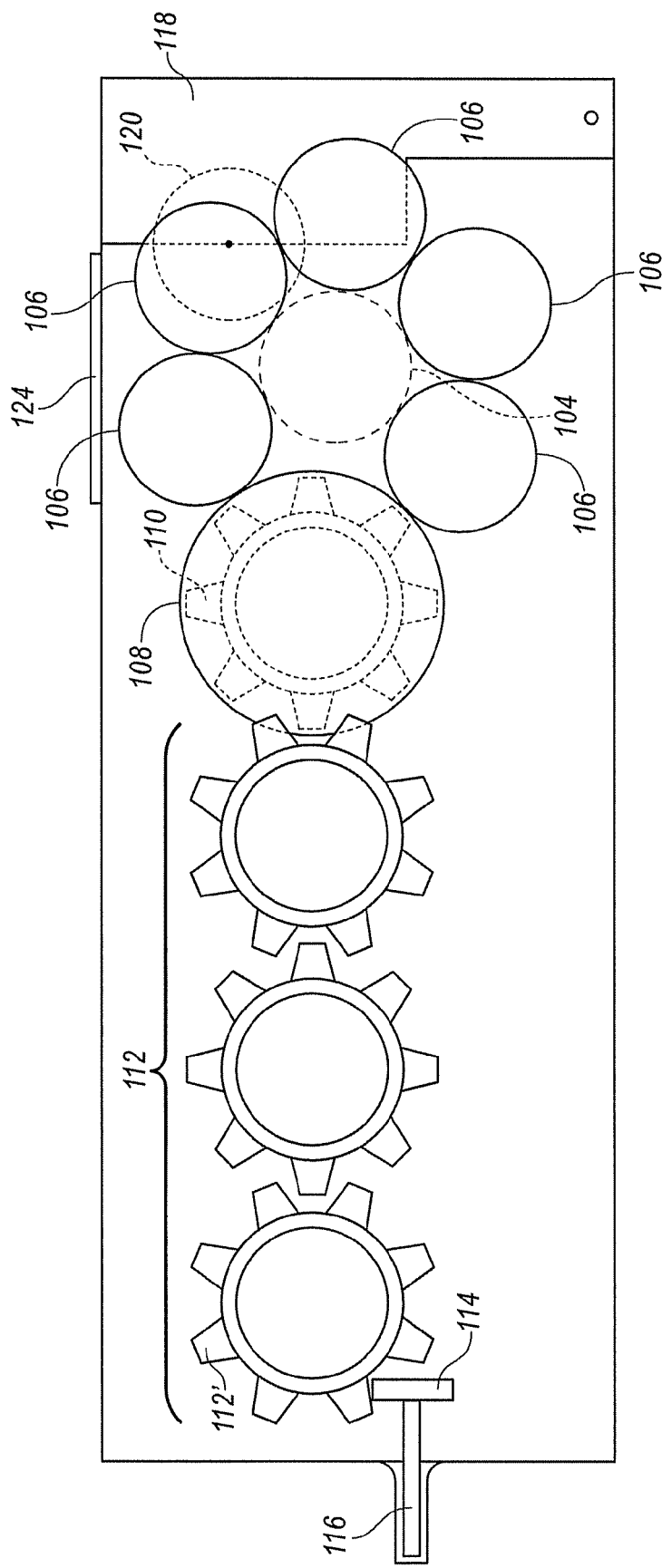
FIG. 9 is a partial cut-away view of the pipe cleaning tool of FIGS. 7 and 8.

In FIGS. 7-9, an alternative embodiment of a pipe cleaning tool 100 that includes a pipe cutter feature is illustrated. Pipe cleaning tool 100 includes a body portion 132 having a plurality of pipe cleaners 140, 150, 152 for use in cleaning a surface of a pipe. While pipe cleaners 140, 150, and 152 are shown so as to be located within pipe cleaning tool 100, it is understood that pipe cleaners 140, 150, and 152 may extend outwardly from an outer surface of pipe cleaning tool 100, as shown in FIG. 4.

In one arrangement, one end 102 of pipe cleaning tool 100 includes an opening 104 through which a section of pipe may be disposed. Referring to FIG. 9, as may be seen, a plurality of rollers 106 are disposed partially around opening 104 in the interior of pipe cleaning tool 100. Rollers 106 serve to retain pipe within in opening 104 such that pipe may be selectively rotated. In one arrangement, rollers 106 are biased toward opening 104 so as to compensate for different sized pipe. In other words, rollers 106 may move a predetermined distance away from opening 104 to allow introduction of a larger pipe.

Rollers 106 are operatively connected to a drive roller 108 that is positioned adjacent to opening 104. Drive roller 108 includes a gear 110 positioned therein. Gear 110 (shown in phantom) meshes with a gear set 112. One of the gears 112' in gear set 112 is operatively connected to a drive gear 114 that is mounted on a drive shaft 116. In operation, as drive shaft 116 rotates, drive gear 114 meshes with gear 112', thereby turning the rest of gear set 112. Rotation of gear set 112 causes drive roller 108 to rotate, which then causes rollers 106 to rotate.

Connected to an end pipe cleaner tool 100 is a selectively detachable cover 118. Cover 118 carries a cutting wheel 120 (shown in phantom). In one arrangement, cover 118 is hingedly connected to the pipe cleaner tool 100 at a lower portion of pipe cleaner tool 100 such that cover 118 may be selectively swung away from pipe cleaner tool 100. Latches (not shown) may be employed to lock cover 118 against pipe cleaner tool 100.

The pipe cutter feature operates as follows. First, cover 118 is at least partially disengaged from pipe cleaner tool 100, pulling cutting wheel 120 away from pipe cleaner tool 100, as well. A pipe is inserted into opening 104. Rollers 106 frictionally engage an outer surface of the pipe to retain pipe 104 within opening 104. Once positioned, cover 118 is moved toward pipe cleaner tool 100, carrying cutting wheel 120. When cutting wheel 120 is positioned against the outer surface of the pipe, drive shaft 116 is operated, thereby causing the pipe to rotate within opening by virtue of gear system 112 and drive roller 108. The cutting wheel 120 is moved axially through the pipe by pressing on an actuation button 122 that may be disposed on cover 118. To observe the cutting operation, an optional window 124 may be provided that is positioned over opening 104.

Figure 10:
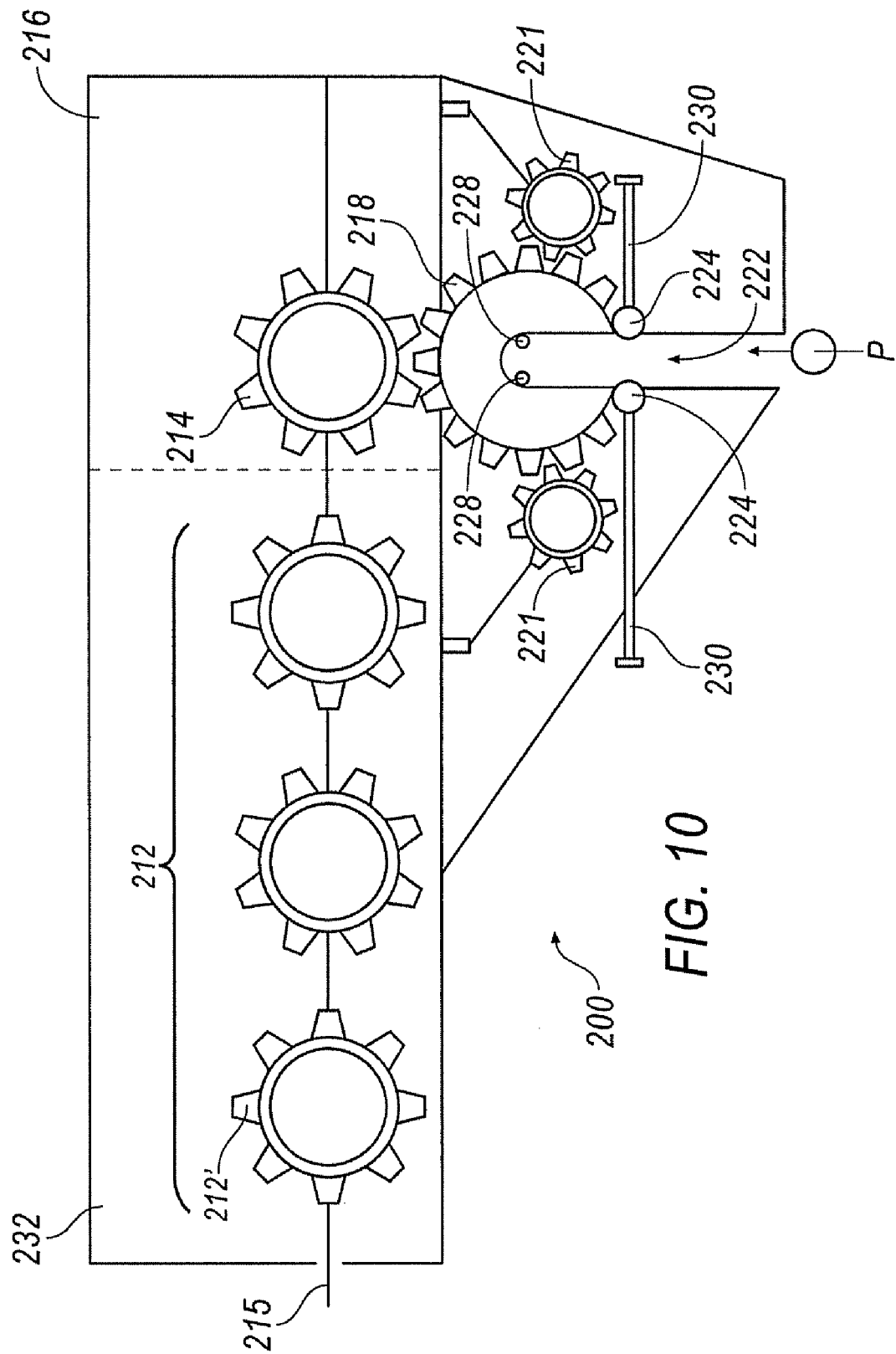
FIG. 10 is a side elevational view of an alternative embodiment of a pipe cleaning tool with an optional pipe cutter section.

A schematic drawing of n alternative embodiment of a pipe cleaner tool 200 with an optional cutter feature is shown in FIG. 10. Pipe cleaner tool 200 has a body portion 232, similar to body portion 32 shown in FIG. 3, including accessory ports 235 for receiving pipe cleaners (such as, for example pipe cleaners 40 and 50). A gear system 212 is disposed within body portion 232 and operatively connected to a drive gear 214 that is housed in a gear housing 216. A horseshoe gear 218 is positioned within a cutter housing 220, with a pair of gears 221 positioned so as to operatively engage with horseshoe gear. The horseshoe gear 218 and walls that define cutter housing 220 are arranged so as to form an elongated slot 222 into which a piece of pipe may be positioned. Positioned at an opening of horseshoe gear 218 is a pair of ball bearings 224. Ball bearings 224 are positioned in grooves 226 formed in cutter housing 220 and arranged such that at least a portion of ball bearings 224 extend into slot 222. Ball bearings 224 serve to retain the pipe within in slot 222. To accommodate different sized pipe, each ball bearing 224 is operatively connected to a selective axially adjustment mechanism 230. Adjustment mechanisms 230 may adjust the degree to which ball bearing 224 extends into slot 222 so as to accommodate different sized pipes.

Also disposed within cutter housing 220 are cutting wheels 228. Cutting wheels 228 are positioned so as to extend within slot 222 so as to contact the pipe when disposed therein.

Cutter housing 220 may be selectively removed from pipe cleaner tool 200. In one arrangement, cutter housing 220 is connected at one end to body portion 232 and connected at another end to gear housing 216 by fasteners, such as screws, for example.

In operation, a pipe is disposed in slot 222 until it is positioned past ball bearings 224 and is received within horseshoe gear 218. Once positioned, adjustment mechanisms are actuated to capture the pipe therewithin. Next, a drive shaft 215 is actuated to, thereby causing gear system 212 to rotate. Gear system 212, which is operatively connected to drive gear 214 thereby operates horseshoe gear 218 which is carrying cutting wheels 228. As horseshoe gear 218 moves, cutting wheels 228 cut the pipe.

Figure 11:
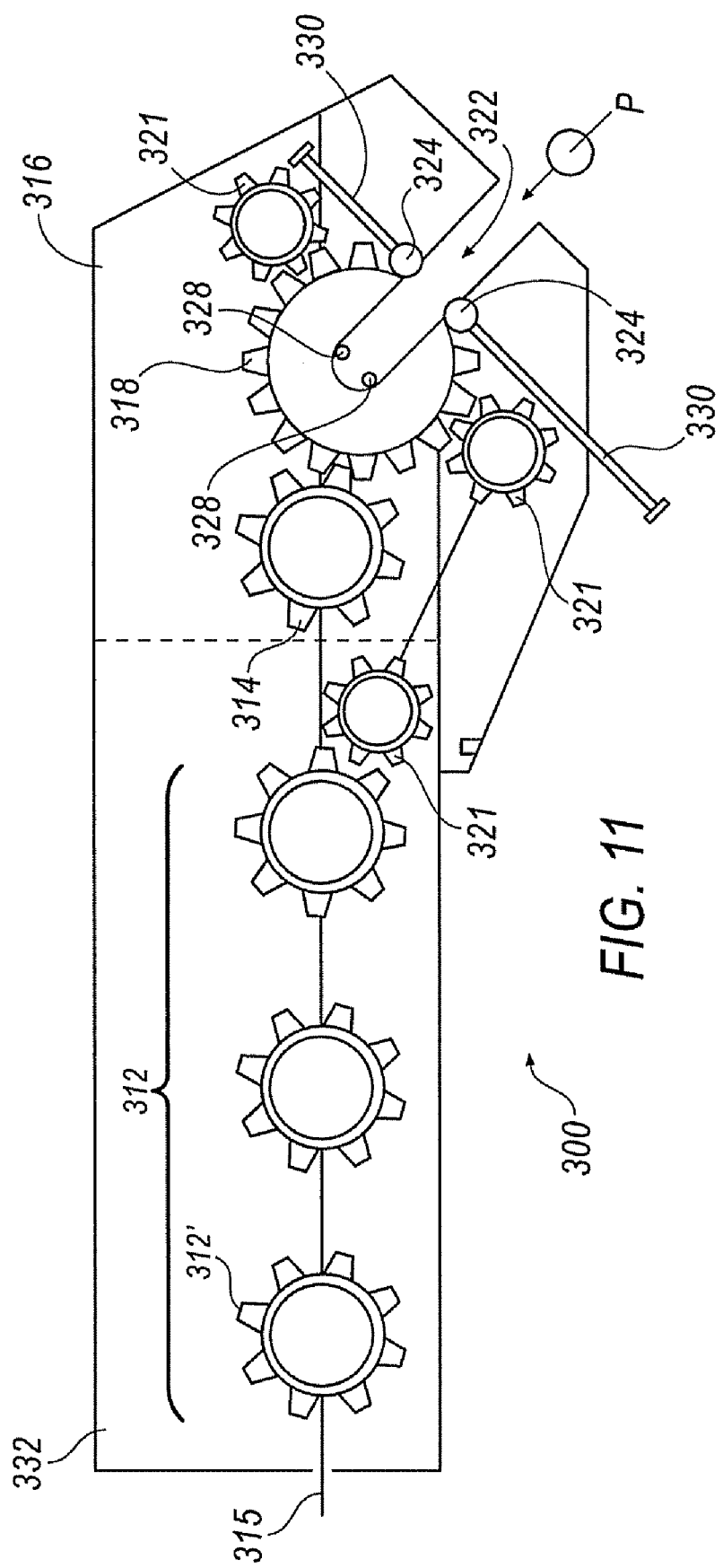
FIG. 11 is another side elevational view of an alternative embodiment of a pipe cleaning tool with an optional pipe cutter section.

Yet another alternative embodiment of a pipe cleaner tool 300 is shown in FIG. 11. Like pipe cleaner tools 100 and 200, pipe cleaner tool 300 includes a body portion 332 which carries a gear system 312, like that which is shown in FIG. 4. Attached to an end of body portion 332 is an optional cutter housing 320. The cutter feature of pipe cleaner tool 300 is similar to that which is shown in FIG. 10. Indeed, the only significant difference is that cutter housing 320 is oriented at an angle off an end of pipe cleaner tool 300. Like pipe cleaner tool 200, pipe cleaner tool 300 includes a horseshoe gear 318 flanked by a pair of gears 321, a pair of cutter wheels 328 disposed within an opening formed by horseshoe gear 318, and a pair of ball bearings 324 positioned on either side of a slot 322. An adjustment mechanism 330 is operatively associated with each ball bearing 324.

Figure 12:
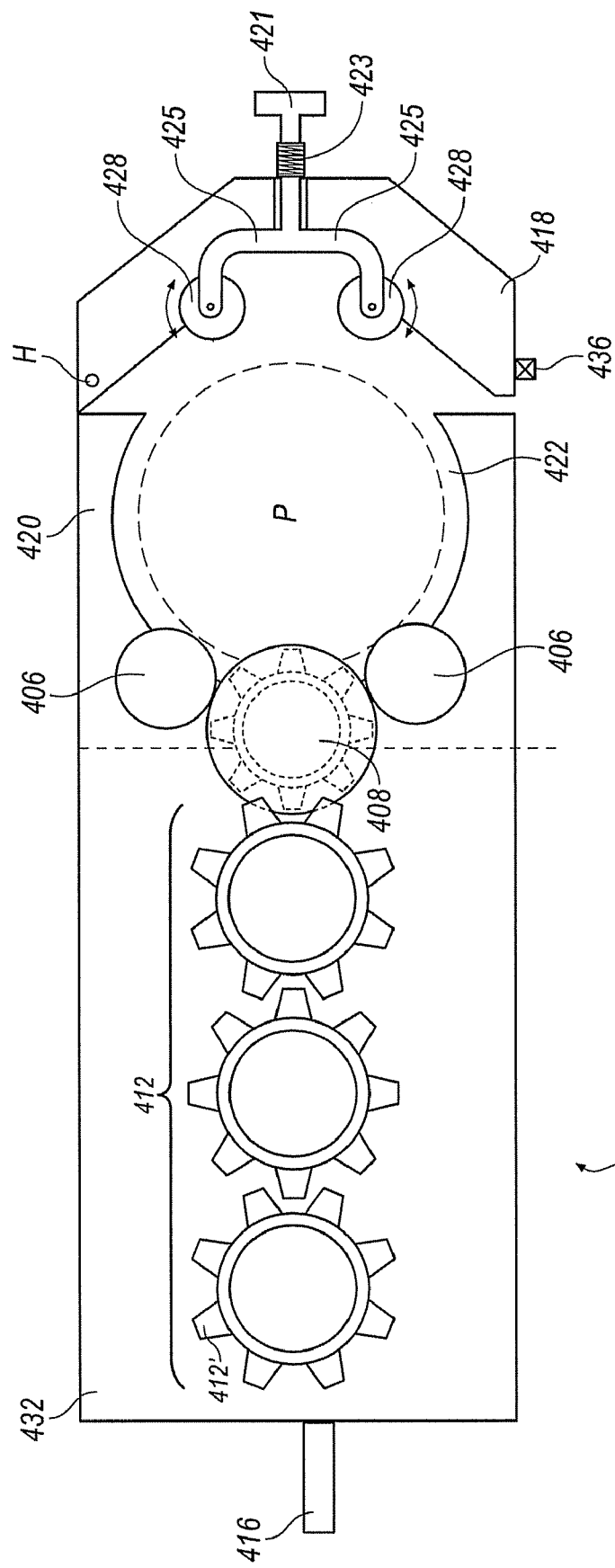
FIG. 12 is yet another alternative arrangement of a pipe cleaning tool with an optional pipe cutter section.

FIG. 12 is yet another embodiment of a pipe cleaner tool 400 that includes a body portion 432 in which a gear system 412 is disposed. Similar to pipe cleaner tool 100, pipe cleaner tool 400 also includes an optional cutter feature. The cutter feature includes a pair of rollers 406 disposed on either side of a drive roller 408. Drive roller contains a gear therein that operatively connects to the gear system 412. Adjacent to rollers 408 is a generally C-shaped groove 422. A portion of rollers 406 extend into groove 422.

Pipe cleaner tool 400 further includes a cover 418 that may selective close off groove 422. In one arrangement, cover 418 is hingedly connected to body portion 432 by a hinge H. A pair of cutting wheels 428 are disposed in cover 418 and rotatably supported by a support member 425. Support member 425 extends through cover 418 and terminates in an actuation button 421. A biasing member 423 is disposed between cover 418 and actuation button 421.

In operation, cover 418 is pivoted away from body portion 432 so as to expose groove 422. Pipe P is placed within groove 422 and cover 418 is pivoted back to body portion 432. Cover is then secured to body portion 432 by a latch 436 or other fastening mechanism. Drive shaft 416 is actuation, which in turn rotates gear system 412. Gear system 412 operates drive roller 408, which in turn rotates rollers 406 and pipe P. Actuation button 421 is depressed against a biasing force generated by biasing member 423, thereby forcing cutting wheels 428 into contact with pipe P. Once actuation member 421 is released, biasing member 423 removes cutting wheels 428 from pipe P.

While the cutter feature has been described as being attached to and formed with a pipe cleaning tool, it understood that the cutter feature may be a stand alone tool. In other words, body portion 132, 232, 323, and 432 need not include attachment features for cleaning brushes.

The preceding description has been presented only to illustrate and describe exemplary embodiments of various pipe cleaning tools according to the claimed invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

The invention claimed is:

1. A pipe cutting tool, comprising:
    a housing; and
    a pipe cutting portion, wherein the cutting portion further comprises:
    a horseshoe gear operatively connected to a pair of driven gears, wherein the driven gears are operatively connected to a drive gear, which is operatively connected to a driveshaft;
    wherein said horseshoe gear has an opening through a periphery thereof so as to at least partially form a slot, whereby the slot is adapted to receive a pipe therein;
    at least one cutting wheel connected to the horseshoe gear such that a cutting edge of the cutting wheel extends at least partially with the slot;
    at least one bearing member disposed adjacent the slot; and
    a biasing member operatively associated with the bearing member.

2. The pipe cutting tool of claim 1, further comprising a plurality of pipe cleaners, wherein the pipe cleaners are adapted to clean at least two different sizes of pipes.

3. A pipe cleaning tool according to claim 2, wherein the body includes a handle.

4. A pipe cleaning tool according to claim 2, wherein the plurality of pipe cleaners include at least an interior pipe cleaner and an exterior pipe cleaner.

5. A pipe cleaning tool according to claim 4, wherein the interior and exterior pipe cleaners are positioned concentrically on opposite exterior surfaces of the housing.

6. A pipe cleaning tool according to claim 4, wherein the interior and exterior pipe cleaners are positioned concentrically on one exterior surface of the housing, such that a pipe's interior and exterior surfaces can be cleaned simultaneously.

7. A pipe cleaning tool according to claim 2 further comprising a drive shaft and a plurality of gears, wherein the plurality of pipe cleaners are rotated by the drive shaft and the plurality of gears.

8. The pipe cleaning tool according to claim 1, wherein the horseshoe gear carries at least a pair of cutting wheels.

9. The pipe cutting tool according to claim 1, comprising at least two bearing members, whereby at least one of bearing members is disposed on each side of the slot.

10. The pipe cleaning tool according to claim 9, further comprising a biasing member operatively associated with each bearing member.

11. A pipe cutting tool, comprising:
a housing; and
a pipe cutting portion that further comprises:
at least one selectively movable cutting wheel; and
a selectively moveable cover that carries the at least one cutting wheel; wherein the cutting wheel is positioned on a support arm that extends through the cover and terminates in an actuation button.

12. A pipe cleaning tool according to claim 11, wherein the pipe cutting portion further comprises a plurality of rollers disposed about a portion of an opening formed within the body, wherein one of the rollers includes a drive gear that operatively connects to a gear system that is actuated by a drive shaft.

13. The pipe cleaning tool according to claim 11, wherein the cover includes a pair of cutting wheels moveably secured thereto.

14. The pipe cleaning tool according to claim 11, further comprising a biasing member positioned between the cover and the actuation button.

15. A mechanical pipe cutting and cleaning tool comprising:
a body;
an interior pipe cleaner;
an exterior pipe cleaner;
a drive shaft;
a plurality of drive gears;
a plurality of accessory gears, wherein the interior and exterior pipe cleaners are connected to a respective accessory gear and positioned in the body, and the accessory gear is rotatably driven by the drive shaft;
wherein the interior and exterior pipe cleaners are positioned concentrically on one exterior surface of the body such that a pipe's interior and exterior surfaces can be cleaned simultaneously; and
a horseshoe gear positioned at an end of the pipe cleaning tool, the horseshoe gear operatively connected to a pair of driven gears, wherein the driven gears are operatively connected to a drive gear, which is operatively connected to the driveshaft;
wherein said horseshoe gear has an opening through a periphery thereof so as to at least partially form a slot, whereby the slot is adapted to receive a pipe therein;
at least one cutting wheel connected to the horseshoe gear such that a cutting edge of the cutting wheel extends at least partially within the slot; and
at least one bearing member disposed adjacent the slot.

\* \* \* \* \*